United States Patent [19]

Simone

[11] Patent Number: 5,638,312
[45] Date of Patent: Jun. 10, 1997

[54] METHOD AND APPARATUS FOR GENERATING A ZERO BIT STATUS FLAG IN A MICROPROCESSOR

[75] Inventor: Michael A. Simone, Sunnyvale, Calif.

[73] Assignee: HaL Computer Systems, Inc., Campbell, Calif.

[21] Appl. No.: 397,800

[22] Filed: Mar. 3, 1995

[51] Int. Cl.[6] .................................. G06F 7/00; G06F 7/38
[52] U.S. Cl. ........................ 364/736.5; 364/715.03; 364/749
[58] Field of Search ..................... 364/715.11, 736, 364/736.5, 715.03, 749

[56] References Cited

U.S. PATENT DOCUMENTS 4,323,981  4/1982  Nakamura .............. 364/736.5 X
5,469,377  11/1995  Amano .................. 364/736.5 X

*Primary Examiner*—Chuong D. Ngo
*Attorney, Agent, or Firm*—Lisa D. Noble; Charles E. Gotlieb

[57] ABSTRACT

A method and apparatus for generating a zero flag (z-flag) status signal in a microprocessor includes a z-flag signal generator that generates a z-flag signal from unaligned data simultaneous to the load alignment of such data. The z-flag generator first performs a zero detect on each byte of data retrieved from memory. The zero detect results are next decoded according to bit selection signals generated from a data format code which corresponds to the specific format of the retrieved data.

6 Claims, 5 Drawing Sheets

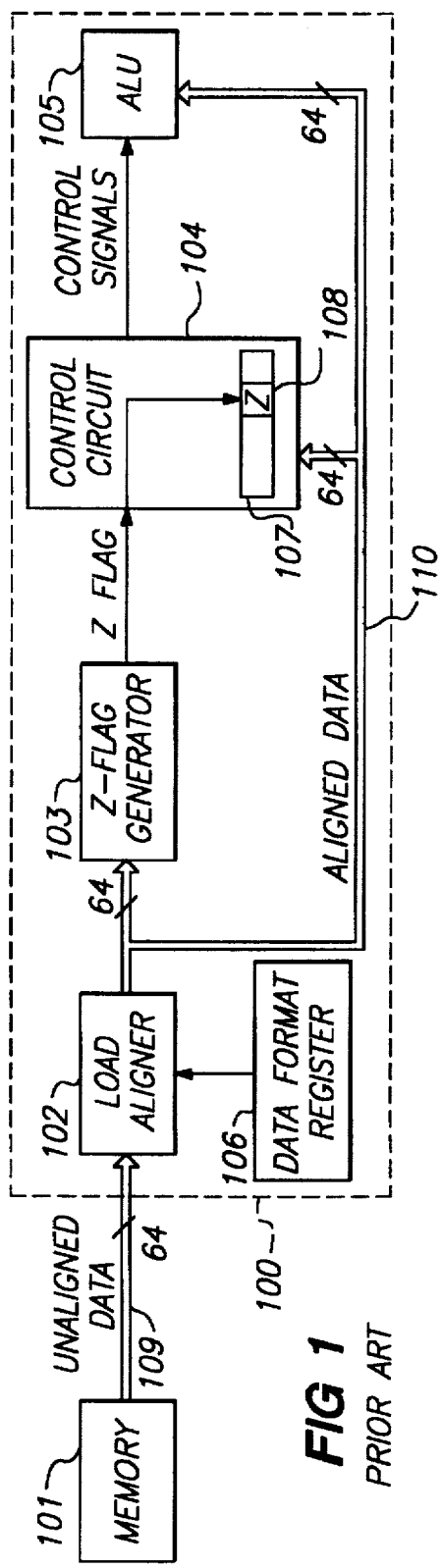
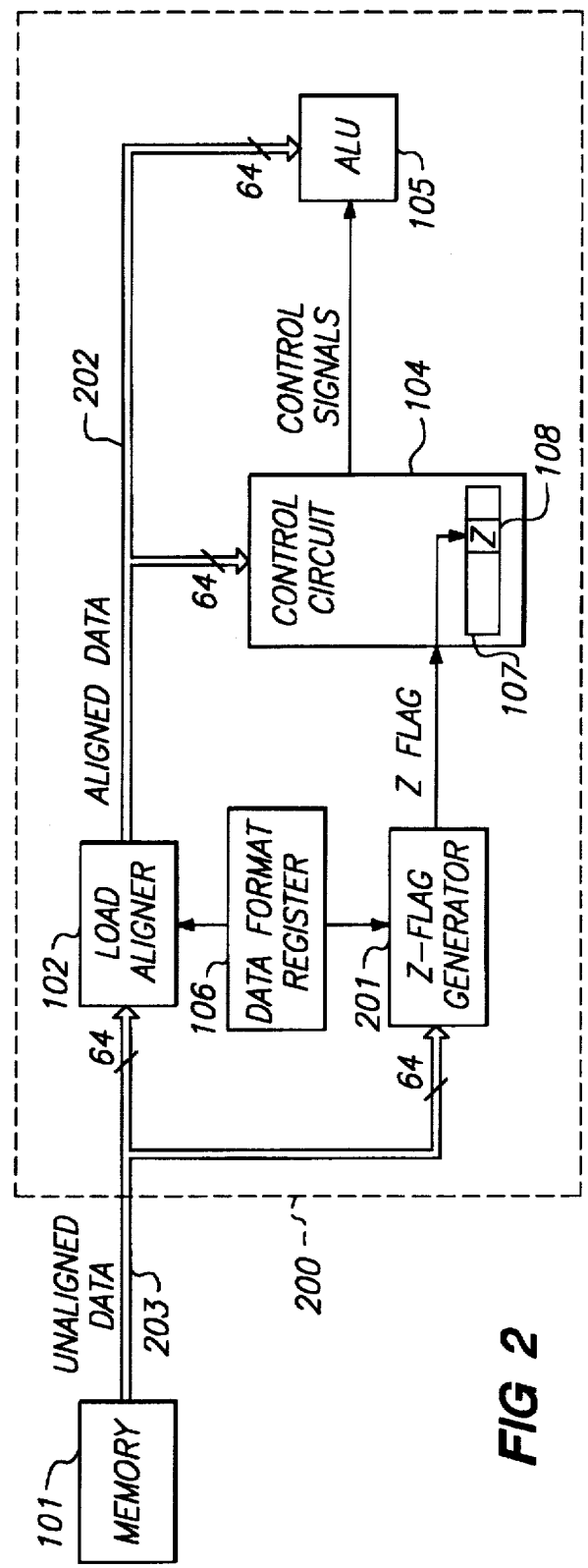
FIG 1 PRIOR ART
FIG 2

METHOD AND APPARATUS FOR GENERATING A ZERO BIT STATUS FLAG IN A MICROPROCESSOR

RELATED APPLICATIONS

The subject matter of this application is related to the subject matter of the following applications:

application Ser. No. 08/388,602 entitled "INSTRUCTION FLOW CONTROL CIRCUIT FOR SUPERSCALER MICROPROCESSOR" filed on Feb. 14, 1994 by Takeshi Kitahara;

application Ser. No. 08/388,389 entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow now abandoned and continued as application Ser. No. 08/517,229;

application Ser. No. 08/388,606 entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender and continued as application Ser. No. 08/518,549;

application Ser. No. 08/388,364 entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender now abandoned and continued as application Ser. No. 08/516,230;

application Ser. No. 08/398,299 entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow;

application Ser. No. 08/397,810 entitled "PARALLEL ACCESS MICRO-TLB TO SPEED UP ADDRESS TRANSLATION" filed on Mar. 3, 1995 by Chih-Wei David Chang, Kioumars Dawallu, Joel F. Boney, Ming-Ying Li and Jen-Hong Charles Chen;

application Ser. No. 08/397,809 entitled "LOOKASIDE BUFFER FOR ADDRESS TRANSLATION IN A COMPUTER SYSTEM" filed on Mar. 3, 1995 by Leon Kuo-Liang Peng, Yolin Lih and Chih-Wei David Chang;

application Ser. No 08/397,893 entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar now abandoned and continued as application Ser. No. 08/522,567;

application Ser. No. 08/397,891 entitled "METHOD AND APPARATUS FOR SELECTING INSTRUCTIONS FROM ONES READY TO EXECUTE" filed on Mar. 3, 1995 by Michael C. Shebanow, John Gmuender, Michael A. Simone, John R. F. S. Szeto, Takumi Maruyama and DeForest W. Tovey now abandoned and continued as application Ser. No. 08/523,384;

application Ser. No. 08/397,911 entitled "HARDWARE SUPPORT FOR FAST SOFTWARE EMULATION OF UNIMPLEMENTED INSTRUCTIONS" filed on Mar. 3, 1995 by Shalesh Thusoo, Farnad Sajjadian, Jaspal Kohli, and Niteen Patkar;

application Ser. No. 08/398,284 entitled "METHOD AND APPARATUS FOR ACCELERATING CONTROL TRANSFER RETURNS" filed on Mar. 3, 1995 by Akiro Katsuno, Sunil Savkar and Michael C. Shebanow now abandoned and continued as application Ser. No. 08/522,845;

application Ser. No. 08/398,066 entitled "METHODS FOR UPDATING FETCH PROGRAM COUNTER" filed on Mar. 3, 1995 by Akira Katsuno, Niteen A. Patkar, Sunil Savkar and Michael C. Shebanow now abandoned and continued as application Ser. No. 08/524,294;

application Ser. No. 08/398,151 entitled "METHOD AND APPARATUS FOR RAPID EXECUTION OF CONTROL TRANSFER INSTRUCTIONS" filed on Mar. 3, 1995 Sunil Savkar;

application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli; and application Ser. No. 08/397,912 entitled "ECC PROTECTED MEMORY ORGANIZATION WITH PIPELINED READ-MODIFY-WRITE ACCESS" filed on Mar. 3, 1995 by Chien Chen and Yizhi Lu;

BACKGROUND OF THE INVENTION

1. Field of the Invention

This invention relates to a microprocessor design and more particularly to the generation of a zero bit status flag in a microprocessor.

2. Description of the Related Art

Conventional microprocessors can be used with internal and/or external memory for storing both instructions and data. One limiting factor in the performance of such a microprocessor is the memory access time. Memory access time is affected by several factors including how efficiently the microprocessor can write the address to the address bus and generate the necessary "READ" signals to activate the memory as well as the speed of the memory itself. Once the data is received by the microprocessor, several other steps may also be required which will add to the total memory access time. These steps include load alignment and zero bit updating described below.

Load alignment is often performed by microprocessors designed to receive data having any one of a variety of data formats. For example, data can vary in (i) the number of bits in the data word (i.e. 8, 16, 32, 64 bits etc.), (ii) the location of those bits within the data word (i.e. upper-most bits, lower-most bits, center bits, etc.), and (iii) the byte storage format (i.e. big-endian, little-endian, etc.). Such microprocessors have a load alignment circuit which converts the received data into a format compatible with the arithmetic logic unit (ALU) of the microprocessor. A load aligner sometimes reformats (aligns) the retrieved data word by first reordering the bits and by then sign extending the most significant bit leaving the reformatted word in a destination register. In such microprocessors, load alignment must be completed before the memory access may be considered complete.

A zero bit (z-bit) update sets the z-bit of a status register in the microprocessor. A z-bit update may be performed in microprocessors having a specialized instruction set which includes instructions whose execution depends on the value of a destination register. For example, a "branch on register value zero" or "move on register value zero" instruction will cause the microprocessor to branch, or move, respectively, if the z- bit in the destination register is zero.

Such branch and move instructions execute more efficiently in microprocessors having a status register associated with the destination register. In this case the status register contains a z-bit indicating whether the current value of the destination register is zero. The z-bit is updated according to a zero flag (z-flag) signal generated by performing a zero detect on the data most recently written to the destination register. Destination registers generally contain data either moved from the arithmetic logic unit (ALU) or data retrieved from memory. In either case, the z-bit of the status register must be updated prior to the execution of such an instruction which must test the value of the z-bit. Therefore, when data is loaded from memory to a destination register, the associated status register must also be updated before the memory access is considered complete.

Conventional microprocessors first load align data retrieved from memory and then update a status register responsive to the value of the retrieved data in a sequential fashion. The retrieved data is first aligned. Then a z-flag is generated from the aligned data. Therefore, the total memory access time of a conventional microprocessor is dependent on the time required to first load align the data and to then generate the z-flag and update the z-bit.

Decreased memory access times allow for a decreased instruction cycle of a microprocessor. Therefore, decreased memory access times are desirable to achieve increased microprocessor performance. Thus, there is a need for a microprocessor that load aligns data and updates the z-bit in a decreased memory access time.

SUMMARY OF THE INVENTION

In accordance with the present invention, there is provided an apparatus and a method for generating a z-flag signal using unaligned data thereby enabling load aligning to be performed in parallel with the z-flag signal generation to achieve a decreased memory access time. The z-flag signal generator has an array of zero-detect circuits, a decoder, and a bit selection circuit. The array of zero-detect circuits performs zero detection on groups of bits (bit groups) in the word retrieved from memory. The bit selection circuit decodes a data format code to generate bit selection signals which configure the decoder for selection of the appropriate bit groups. The decoder decodes the outputs of the zero-detect circuits in accordance with the bit selection signals and generates the z-flag signal. The z-flag signal is used to update the z-bit of a status register. Thus, in accordance with the present invention, a z-flag signal is generated and the z-bit is updated from unaligned data. Simultaneous to the update of the z-bit, unaligned data retrieved from memory is load aligned using a load alignment circuit.

In one embodiment, the bit groups are comprised of eight bits thereby grouping the received data word into bytes. A zero detect is performed on each byte using a logic circuit comprised of an array of NOR gates having outputs coupled to a NAND gate. In this embodiment, the bit selection signals are byte selection signals that select which bytes are to be decoded.

BRIEF DESCRIPTION OF THE DRAWINGS

FIG. 1 is a block diagram illustrating conventional load alignment and z-flag generation circuitry in a microprocessor;

FIG. 2 is a block diagram illustrating load alignment and z-flag generation circuitry in a microprocessor in accordance with the present invention;

DESCRIPTION OF THE PREFERRED EMBODIMENT

Figure 3:
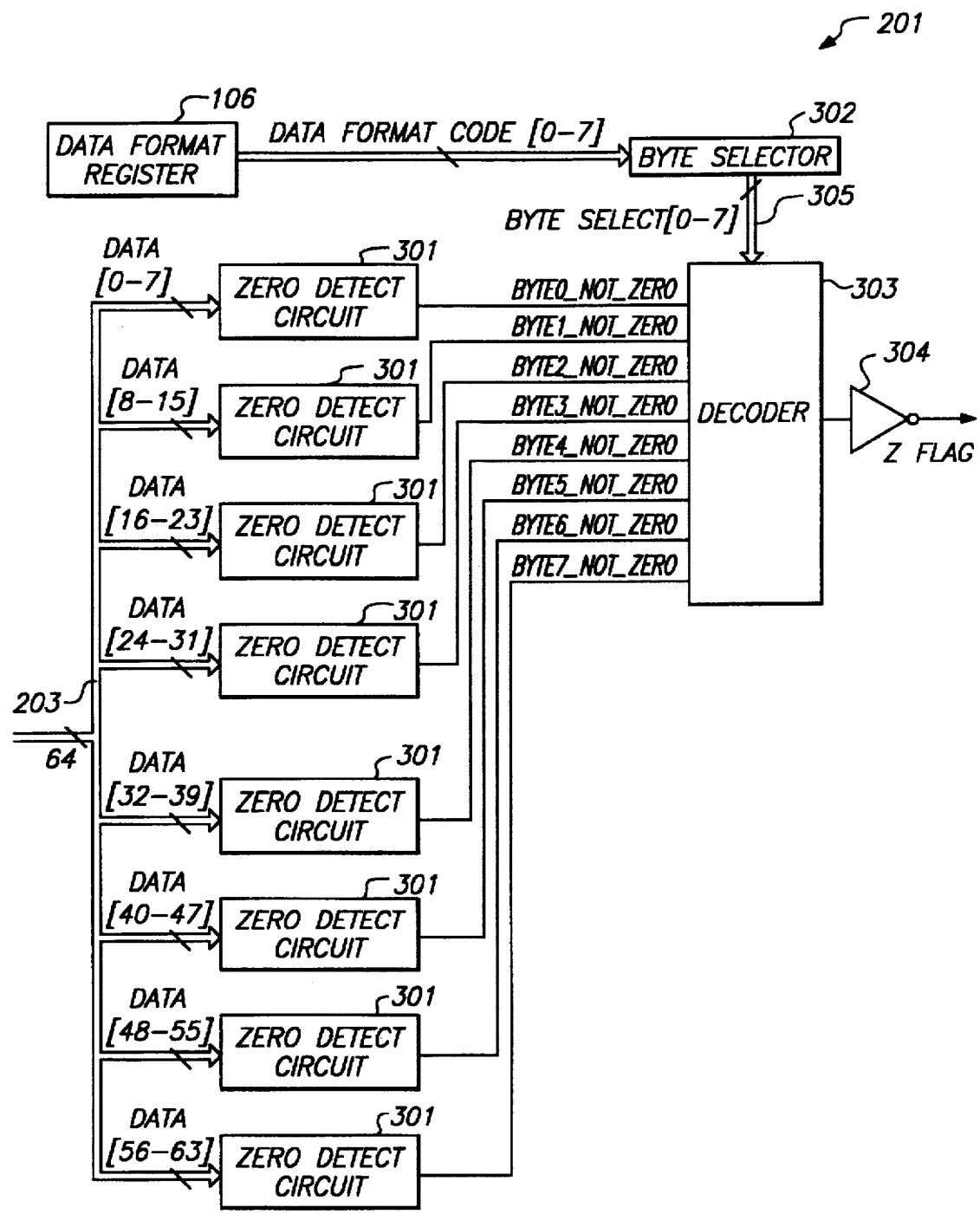
FIG. 3 is a block diagram of a z-flag generation circuit in accordance with the present invention.

Conventional microprocessors have a control unit, an arithmetic logic unit (ALU), an address bus and a data bus. Such a microprocessor is typically connected to one or more memory devices for storing microprocessor instructions and data. A conventional microprocessor retrieves instructions and data from memory by placing a selected address on the address bus and by asserting specified control signals to initiate a memory access. After the memory access is complete, the data bus carries the retrieved instruction or data word. The data bus is typically coupled to both the control unit and the ALU. Instructions retrieved from memory are decoded by the control unit and the retrieved data word is generally written to a register or an accumulator in the ALU. Some microprocessors have additional circuitry for load aligning data retrieved from memory and for generating status signals to set status bits of a status register associated with the retrieved data.

There is illustrated in FIG. 1 conventional microprocessor 100 having load aligner 102 and z-flag generator 103. It should be noted that the conventional address bus and certain conventional control signals of microprocessor 100 are not illustrated to preserve the clarity of FIG. 1. Load aligner 102 is coupled to memory 101 by data bus 109 and is also coupled to data format register 106. Load aligner 102 aligns data received from memory 101 to conform the format of the received data with the alignment requirements of control unit 104 and arithmetic logic unit 105. Z-flag generator 103 is coupled to data bus 110 which carries aligned data. Z-flag generator 103 generates a z-flag signal responsive to the value of the aligned data on data bus 110. In conventional microprocessor 100, load alignment is performed prior to z-flag generation and thus load aligner 102 and z-flag generator 103 are coupled serially.

There is illustrated in FIG. 2 microprocessor 200 in accordance with the present invention. Microprocessor 200 has a z-flag generator 201 which is coupled in parallel with and operates simultaneous to load aligner 102. In the illustrated embodiment, both load aligner 102 and z-flag generator 201 are electrically coupled to memory 101 by data bus 203. In accordance with the illustrated embodiment, data bus 203 is 64 bits wide and carries unaligned data retrieved from memory 101. It should be noted that the principles of the present invention apply to data words wider than and smaller than 64 bits, for example 32 bit words, 128 bit words etc. Memory 101 is a data storage device such as a data cache and contains unaligned eight byte words (64 bit words). It should be noted that although the illustrated embodiment shows microprocessor 200 having external memory, the principles of the present invention apply equally to data retrieved from memory internal to microprocessor 200 or to data received from any other storage device or data source. Load aligner 102 and z-flag generator 201 are both coupled to data format register 106.

Data format register 106 contains a data format code indicating the format of the retrieved unaligned data. The data format register 106 is updated by microprocessor 200 on reset or may be updated dynamically as microprocessor 200 operates. It should be noted that the data format code need not be stored in a register. Such a code may also be set manually using switches or in any other way which generates a code signal receivable by load aligner 102 and z-flag generator 201. In the illustrated embodiment, the data format register 106 is eight bits, B[7:0] corresponding to an eight bit data format code. The eight bit code has 28, or 256, possible states corresponding to various data format parameters such as the endianness (i.e. big- or little-endian), size and location of the data within the retrieved eight byte word. Tables 1–5 show the data format parameters indicated by the eight bit data format code B[7–0] stored in data format register 106**.

TABLE 1

| B[0] | Sign Extension |
| --- | --- |
| 0 | No Sign Extension |
| 1 | Sign Extend |

TABLE 2

| B[1] | Format Type |
| --- | --- |
| 0 | Fixed Point |
| 1 | Floating Point |

TABLE 3

| B[4] | B[3] | B[2] | Byte Address |
| --- | --- | --- | --- |
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

TABLE 4

| B[5] | Endianness |
| --- | --- |
| 0 | Little-Endian |
| 1 | Big-Endian |

TABLE 5

| B[7] | B[6] | Load Size |
| --- | --- | --- |
| 0 | 0 | 8 bits |
| 0 | 1 | 16 bits |
| 1 | 0 | 32 bits |
| 1 | 1 | 64 bits |

As shown in Table 1, Bit 0 (B[0]) indicates whether the retrieved data is to be sign extended. Bit 1 (B[1]), shown in Table 2, indicates the type of the data, for example whether the retrieved data is stored in a fixed or floating point format. Bits 4–2 (B[4:2]) are shown in Table 3 and indicate the byte address of the data. The byte address is the first byte location (byte 0 to 7) of the data within the retrieved unaligned eight byte data word. As shown in Table 4, Bit 5 (B[5]) indicates whether the retrieved data is stored in big- or little-endian format. Bits 7 and 6 (B[7:6]), shown in Table 5, indicate the load size of the data, for example whether the valid data is 8, 16, 32 or 64 bits. It should be noted that to the extent that the load size is less than the number of bytes in the retrieved word, the retrieved word contains invalid data: For example, if the load size is two bytes (16 bits) then six bytes (48 bits) of the retrieved eight byte word is not valid data. Only two of the eight bytes (16 bits), are valid data. After load alignment, all data bytes are valid, the data having been sign or zero extended.

Referring again to FIG. 2, control circuit 104 is connected to data bus 202. Data bus 202 is coupled to load aligner 102 and carries aligned data. Control circuit 104 has status register 107 having a zero bit (z-bit) 108. Z-bit 108 is set to the "1" ("high") state if the value of the aligned data is zero. The value of the aligned data is zero if each bit of aligned data has a "0" ("low") state.

Z-flag generator 201 is electrically coupled to memory 101 by data bus 203. Z-flag generator 201 is also electrically coupled to data format register 106. Z-flag generator 201 generates a z-flag signal having either a "0" or "1" state dependent on whether the value of the valid data in the retrieved word is zero. As discussed above, some bits of the aligned data are not valid and thus z-flag generator 201 decodes data format register 106 to perform a zero-detection on only the valid data bits. Therefore, although z-flag generator 201 is coupled to all 64 bits of data bus 203, z-flag generator 201 produces the z-flag using only a selected set of bits responsive to the data format code received from data format register 106. Such selection enables z-flag generator 201 to produce a z-flag signal using unaligned data received from data bus 203. Because z-flag generator 201 of the present invention produces a z-flag signal using unaligned data, z-flag generator 201 and load aligner 102 are both coupled, in parallel, to data bus 203 and thus z-flag generation is performed simultaneous to load alignment thereby increasing the performance of microprocessor 200.

Referring now to FIG. 3, z-flag generator 201 in accordance with the present invention is illustrated. Z-flag generator 201 comprises an array of zero-detect circuits 301, byte selector 302 and decoder 303. In accordance with the illustrated embodiment, each zero-detect circuit 301 is coupled to data bus 203. Each zero-detect circuit 301 is coupled to a group of bits of data bus 203 to form a bit group. In the illustrated embodiment, the bit group contains eight bits (a byte) of data. If any one bit of the bit group (the byte) is not zero, i.e. not in the "0" ("low") state, then the corresponding Byte_Not_Zero output of zero-detect circuit 301 will have a "1" ("High") state. The Byte_Not_Zero output of each zero-detect circuit 301 is coupled to decoder 303. Decoder 303 is also coupled to eight byte select signals 305 (Byte Select [0–7]).

Byte select signals 305 are generated by byte selector 302. Byte selector 302 is coupled to data format register 106. Byte selector 302 decodes the data format code contained in register 106 and sets each byte select signal 305 to either a "1" or "0" state indicating that the corresponding byte of the retrieved eight byte word contains valid data. Byte selector 302 contains logic gates coupled to generate byte select signals 305 (Byte Select [0–7]) in accordance with the logic table shown in Table 6. In the illustrated embodiment, a byte select signal having a "1" state indicates that the corresponding byte is valid data. A byte select signal having a "0" state indicates that the corresponding byte is not valid data.

TABLE 6

| | | | | | \multicolumn{8}{c}{Byte_Select[0:7]} |
| B[7] | B[6] | B[4] | B[3] | B[2] | 0 | 1 | 2 | 3 | 4 | 5 | 6 | 7 |
| --- | --- | --- | --- | --- | --- | --- | --- | --- | --- | --- | --- | --- |
| 0 | 0 | 0 | 0 | 0 | 1 | 0 | 0 | 0 | 0 | 0 | 0 | 0 |
| 0 | 0 | 0 | 0 | 1 | 0 | 1 | 0 | 0 | 0 | 0 | 0 | 0 |
| 0 | 0 | 0 | 1 | 0 | 0 | 0 | 1 | 0 | 0 | 0 | 0 | 0 |
| 0 | 0 | 0 | 1 | 1 | 0 | 0 | 0 | 1 | 0 | 0 | 0 | 0 |
| 0 | 0 | 1 | 0 | 0 | 0 | 0 | 0 | 0 | 1 | 0 | 0 | 0 |
| 0 | 0 | 1 | 0 | 1 | 0 | 0 | 0 | 0 | 0 | 1 | 0 | 0 |
| 0 | 0 | 1 | 1 | 0 | 0 | 0 | 0 | 0 | 0 | 0 | 1 | 0 |
| 0 | 0 | 1 | 1 | 1 | 0 | 0 | 0 | 0 | 0 | 0 | 0 | 1 |
| 0 | 1 | 0 | 0 | x | 1 | 1 | 0 | 0 | 0 | 0 | 0 | 0 |
| 0 | 1 | 0 | 1 | x | 0 | 0 | 1 | 1 | 0 | 0 | 0 | 0 |
| 0 | 1 | 1 | 0 | x | 0 | 0 | 0 | 0 | 1 | 1 | 0 | 0 |
| 0 | 1 | 1 | 1 | x | 0 | 0 | 0 | 0 | 0 | 0 | 1 | 1 |
| 1 | 0 | 0 | x | x | 1 | 1 | 1 | 1 | 0 | 0 | 0 | 0 |
| 1 | 0 | 1 | x | x | 0 | 0 | 0 | 0 | 1 | 1 | 1 | 1 |
| 1 | 1 | x | x | x | 1 | 1 | 1 | 1 | 1 | 1 | 1 | 1 |

Decoder 303 generates an output having either a "1" or "0" state after decoding byte select signals 305 and the Byte_Not_Zero signals received from each zero-detect circuit 301. In the illustrated embodiment, each byte selection signal 305 has a one-to-one correspondence with a Byte_Not_Zero output of zero-detect circuit 301 to either select or de-select the corresponding Byte_Not_Zero output dependent on whether the corresponding data byte is valid or invalid. If any one of the selected Byte_Not_Zero signals has a "1" state then the output of decoder 303 will have a "1" ("high") state. Decoder 303 is coupled to inverter 304. The output of decoder 303 is inverted by inverter 304 to generate a z-flag signal which has a "1" ("high") state only if each bit of the selected (valid) data bytes has a "0" ("low") state.

Figure 4:
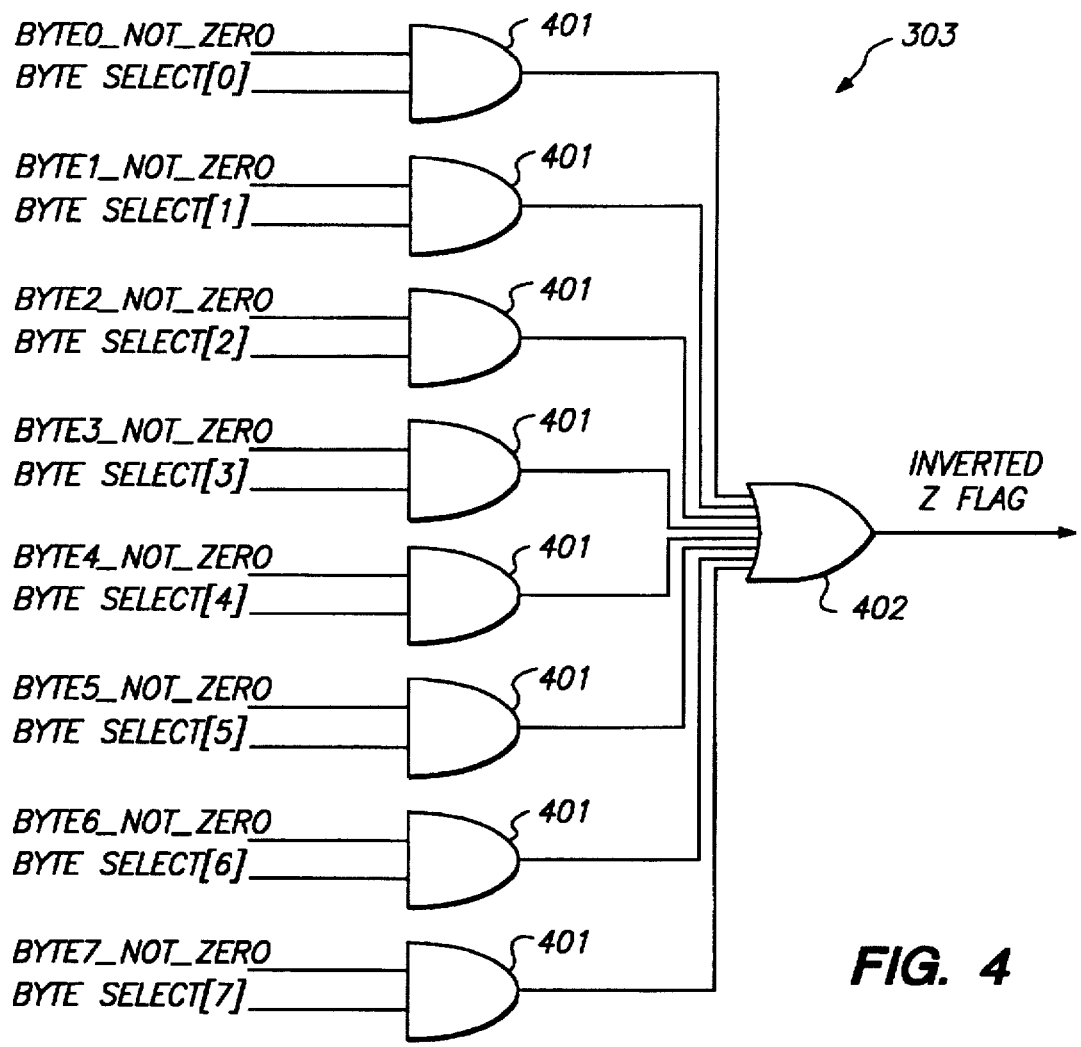
FIG. 4 is a schematic diagram of a decoder circuit in accordance with the present invention.

Referring now to FIG. 4, a decoder 303 in accordance with the present invention is illustrated. Decoder 303 comprises a network of logic gates 401, 402. Each of the eight AND gates 401 is coupled to a Byte_Not_Zero output of zero-detect circuit 301 and to a byte select output of byte selector 302 to produce an output which is coupled to one of the eight inputs of OR gate 402. OR gate 402 performs a logical "OR" function to generate an inverted z-flag signal. Although the illustrated decoder 303 of FIG. 4 comprises a logic network of AND and OR gates 401, 402, decoder 303 can readily be implemented using other logic devices such as NOR gates and NAND gates.

Figure 5:
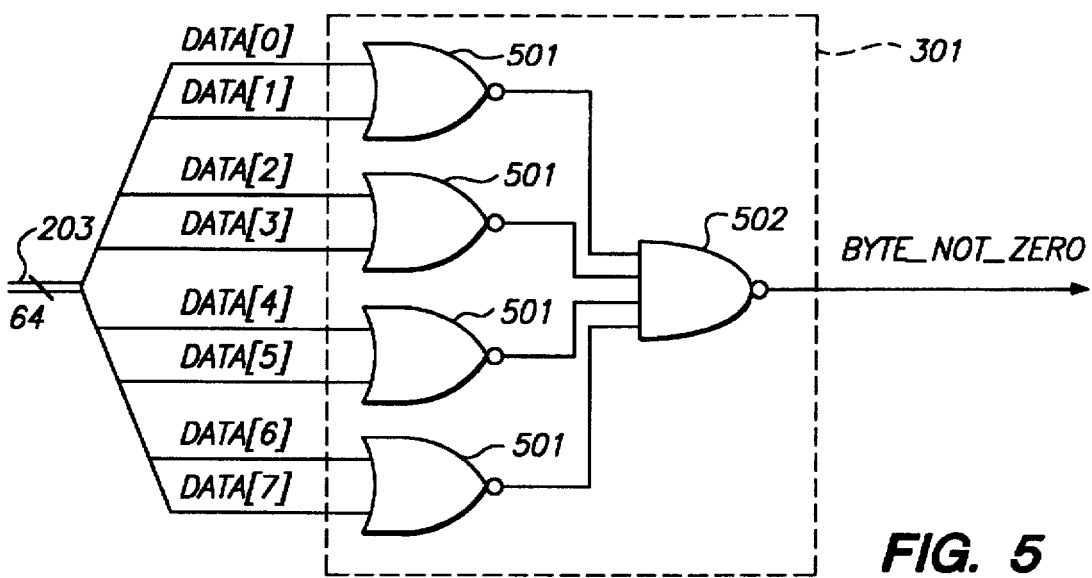
FIG. 5 is a schematic diagram of a zero-detect circuit in accordance with the present invention.

Referring now to FIG. 5, a zero-detect circuit 301 in accordance with the present invention is illustrated. Zero-detect circuit 301 comprises a network of logic gates 501, 502. An array of two input NOR gates 501 are coupled to data bus 203 to produce an array of outputs which are coupled to and logically combined by NAND gate 502. In accordance with the illustrated embodiment, zero-detect circuit 301 comprises four two input NOR gates coupled to eight bits (one byte) of data bus 203. For diagrammatic convenience, numerically adjacent bits are paired, thus data bits 0 and I are paired, 2 and 3 are paired etc. If each of the eight bits (Data[0–7]) have a "0" ("low") state, then zero-detect circuit 301 produces a "0" ("low") state on the Byte_Not_Zero output. However if any one of the bits Data[0–7] has a "1" ("high") state then zero-detect circuit 301 produces a "1" ("high") state on the Byte_Not_Zero output. NOR and NAND gates perform NORing and NANDing functions respectively. Although the illustrated zero-detect circuit 301 of FIG. 5 comprises a logic network of NOR and NAND gates 501, 502, zero-detect circuit 301 can readily be implemented using other logic devices such as OR gates and AND gates.

Figure 6:
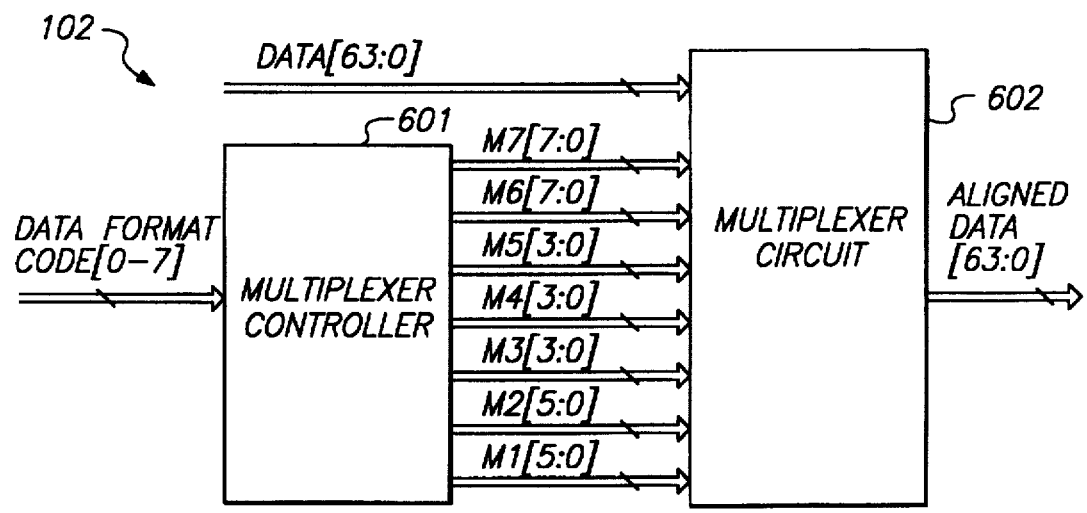
FIG. 6 is a schematic diagram of a load aligner in accordance with the present invention.
Figure 7:
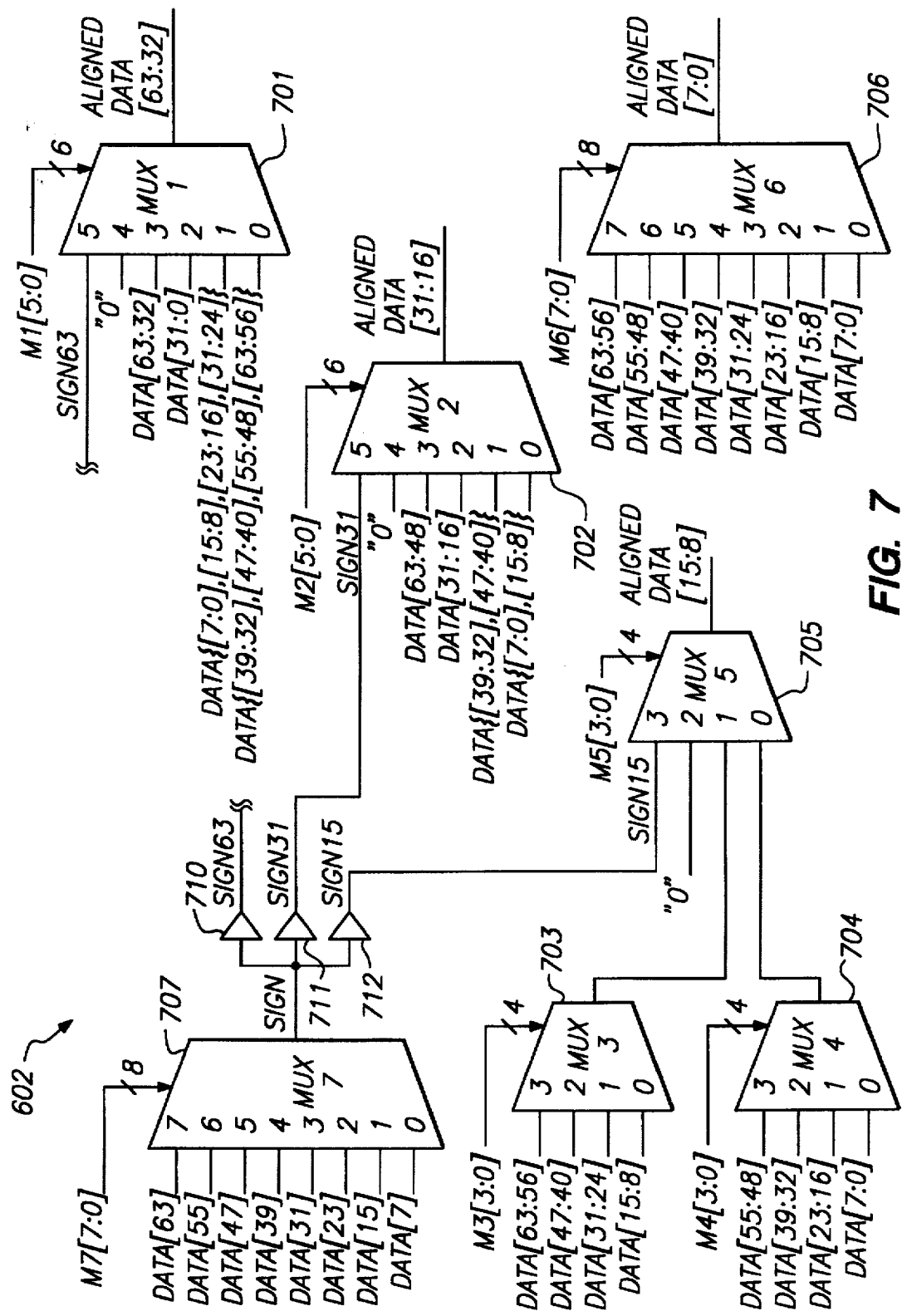
FIG. 7 is a schematic diagram of a multiplexer circuit in accordance with the present invention.

Referring now to FIG. 6, a load aligner 102 in accordance with the present invention is illustrated. Load aligner 102 contains multiplexer controller 601 and multiplexer circuit 602. Load aligner aligns eight bytes of unaligned data received from a data storage device such as memory 101 or from any other data source. In the illustrated embodiment, 64 bits of unaligned data are received and coupled to the input of multiplexer circuit 602. Multiplexer circuit 602, as illustrated in FIG. 7, includes multiplexers 701–707 and drivers 710–712. Each multiplexer 701–707 has a plurality of inputs, each input including a plurality of signals or bits. Multiplexer 701, for example has six selectable inputs, inputs 0–5. Each input 0–5 comprises 32 bits. Input 0 of multiplexer 701 is coupled to data bits 32–63 in reverse byte order. Input 1 of multiplexer 701 is coupled to data bits 0–31 in reverse byte order. Input 2 of multiplexer 701 is coupled to data bits 0–31 in sequential byte order. Input 3 of multiplexer 701 is coupled to data bits 32–63 in sequential byte order. Input 4 of multiplexer 701 is coupled to 32 signals having a "0" state such as ground. Input 5 of multiplexer 701 is the sign extension input and is coupled to the output of driver 710 which drives 32 signal lines. Multiplexer 701 has five control signals, M1[5:0]. Only one of the five control signals M1[5:0] has a "1" ("High") state, the others have a "0" ("low") state. The input corresponding to the control signal having the "1" ("High") state is selected to pass the input through to the multiplexer output. Each multiplexer 701–707 is coupled to a group of control signals which select the group of inputs to be passed through to the multiplexer output. By selectively passing groups of data bits, sign bits and "0" bits through each multiplexer 701–707, the unaligned data word is load aligned to conform to a desired data format. In the illustrated embodiment, data is aligned to the lowest order byte of the aligned data word.

Referring again to FIG. 6, multiplexer controller 601 generates control signals (M1[5:0], M2[5:0], M3[3:0], M4[3:0], M5[3:0], M6[7:0], M7[7:0]) for each multiplexer 701–707 respectively. As discussed above, the unaligned data word has a data format indicated by the state of data format register 106. Tables 1–5, above show the several data format parameters. Multiplexer controller 601 has an input for receiving an eight bit (B[0–7]) data format code from data format register 106. Multiplexer controller 601 decodes the received eight bits B[0–7]to generate seven sets of multiplexer control signals (M1[5:0], M2[5:0], M3[:0], M4[3:0], M5[3:0], M6[7:0], M7[7:0]). Tables 7–10 show the decoding of the data format code B[0–7]. Table 7 shows the decoding for a load size of 8 bits (an 8 bit load). As shown in Table 5 above, a load size of 8 bits is indicated when bits 7 and 6 (B[6], B[7]) of the data format register each have a "0" state. Table 7 shows which select signal is set to "1" ("select") for each group of multiplexer control signals (M1[5:0], M2[5:0], M3[3:0], M4[3:0], M5[3:0], M6[7:0], M7[7:0]). The number in each multiplexer select signal column corresponds to the multiplexer control signal having a "1" ("select") state for the given data format code state. Only one control signal in each group has a "1" ("select") state and all others in the group will have a "0" ("de-select") state. An "x" in a column indicates a "don't care" or indifference state. Tables 8, 9, and 10 show the decode of B[0–7]for load sizes of 16, 32 and 64 bits respectively.

TABLE 7

(8 bit load)

| | | | | | | | | Multiplexer Select Signals | | | | | | |
|---|---|---|---|---|---|---|---|---|---|---|---|---|---|---|
| B[7] | B[6] | B[5] | B[4] | B[3] | B[2] | B[1] | B[0] | M1 | M2 | M3 | M4 | M5 | M6 | M7 |
| 0 | 0 | X | 0 | 0 | 0 | X | 0 | 4 | 4 | x | x | 2 | 7 | 7 |
| 0 | 0 | X | 0 | 0 | 1 | X | 0 | 4 | 4 | x | x | 2 | 6 | 6 |
| 0 | 0 | X | 0 | 1 | 0 | X | 0 | 4 | 4 | x | x | 2 | 5 | 5 |
| 0 | 0 | X | 0 | 1 | 1 | X | 0 | 4 | 4 | x | x | 2 | 4 | 4 |
| 0 | 0 | X | 1 | 0 | 0 | X | 0 | 4 | 4 | x | x | 2 | 3 | 3 |
| 0 | 0 | X | 1 | 0 | 1 | X | 0 | 4 | 4 | x | x | 2 | 2 | 2 |
| 0 | 0 | X | 1 | 1 | 0 | X | 0 | 4 | 4 | x | x | 2 | 1 | 1 |
| 0 | 0 | X | 1 | 1 | 1 | X | 0 | 4 | 4 | x | x | 2 | 0 | 0 |
| 0 | 0 | X | 0 | 0 | 0 | X | 1 | 5 | 5 | x | x | 3 | 7 | 7 |
| 0 | 0 | X | 0 | 0 | 1 | X | 1 | 5 | 5 | x | x | 3 | 6 | 6 |
| 0 | 0 | X | 0 | 1 | 0 | X | 1 | 5 | 5 | x | x | 3 | 5 | 5 |
| 0 | 0 | X | 0 | 1 | 1 | X | 1 | 5 | 5 | x | x | 3 | 4 | 4 |
| 0 | 0 | X | 1 | 0 | 0 | X | 1 | 5 | 5 | x | x | 3 | 3 | 3 |
| 0 | 0 | X | 1 | 0 | 1 | X | 1 | 5 | 5 | x | x | 3 | 2 | 2 |
| 0 | 0 | X | 1 | 1 | 0 | X | 1 | 5 | 5 | x | x | 3 | 1 | 1 |
| 0 | 0 | X | 1 | 1 | 1 | X | 1 | 5 | 5 | x | x | 3 | 0 | 0 |

TABLE 8

(16 bit load)

| | | | | | | | | Multiplexer Select Signals | | | | | | |
|---|---|---|---|---|---|---|---|---|---|---|---|---|---|---|
| B[7] | B[6] | B[5] | B[4] | B[3] | B[2] | B[1] | B[0] | M1 | M2 | M3 | M4 | M5 | M6 | M7 |
| 0 | 1 | 0 | 0 | 0 | X | X | 0 | 4 | 4 | 3 | 3 | 0 | 7 | 6 |
| 0 | 1 | 0 | 0 | 1 | X | X | 0 | 4 | 4 | 2 | 2 | 0 | 5 | 4 |
| 0 | 1 | 0 | 1 | 0 | X | X | 0 | 4 | 4 | 1 | 1 | 0 | 3 | 2 |
| 0 | 1 | 0 | 1 | 1 | X | X | 0 | 4 | 4 | 0 | 0 | 0 | 1 | 0 |
| 0 | 1 | 1 | 0 | 0 | X | X | 0 | 4 | 4 | 3 | 3 | 1 | 6 | 7 |
| 0 | 1 | 1 | 0 | 1 | X | X | 0 | 4 | 4 | 2 | 2 | 1 | 4 | 5 |
| 0 | 1 | 1 | 1 | 0 | X | X | 0 | 4 | 4 | 1 | 1 | 1 | 2 | 3 |
| 0 | 1 | 1 | 1 | 1 | X | X | 0 | 4 | 4 | 0 | 0 | 1 | 0 | 1 |
| 0 | 1 | 0 | 0 | 0 | X | X | 1 | 5 | 5 | 3 | 3 | 0 | 7 | 6 |
| 0 | 1 | 0 | 0 | 1 | X | X | 1 | 5 | 5 | 2 | 2 | 0 | 5 | 4 |
| 0 | 1 | 0 | 1 | 0 | X | X | 1 | 5 | 5 | 1 | 1 | 0 | 3 | 2 |
| 0 | 1 | 0 | 1 | 1 | X | X | 1 | 5 | 5 | 0 | 0 | 0 | 1 | 0 |
| 0 | 1 | 1 | 0 | 0 | X | X | 1 | 5 | 5 | 3 | 3 | 1 | 6 | 7 |
| 0 | 1 | 1 | 0 | 1 | X | X | 1 | 5 | 5 | 2 | 2 | 1 | 4 | 5 |
| 0 | 1 | 1 | 1 | 0 | X | X | 1 | 5 | 5 | 1 | 1 | 1 | 2 | 3 |
| 0 | 1 | 1 | 1 | 1 | X | X | 1 | 5 | 5 | 0 | 0 | 1 | 0 | 1 |

TABLE 9

(32 bit load)

| | | | | | | | | Multiplexer Select Signals | | | | | | |
|---|---|---|---|---|---|---|---|---|---|---|---|---|---|---|
| B[7] | B[6] | B[5] | B[4] | B[3] | B[2] | B[1] | B[0] | M1 | M2 | M3 | M4 | M5 | M6 | M7 |
| 1 | 0 | 0 | 0 | X | X | 0 | 0 | 4 | 1 | 2 | 3 | 0 | 7 | 4 |
| 1 | 0 | 0 | 1 | X | X | 0 | 0 | 4 | 0 | 0 | 1 | 0 | 3 | 0 |
| 1 | 0 | 1 | 0 | X | X | 0 | 0 | 4 | 3 | 2 | 3 | 1 | 4 | 7 |
| 1 | 0 | 1 | 1 | X | X | 0 | 0 | 4 | 2 | 0 | 1 | 1 | 0 | 3 |
| 1 | 0 | 0 | 0 | X | X | 1 | 0 | 0 | 1 | 2 | 3 | 0 | 7 | 4 |
| 1 | 0 | 0 | 1 | X | X | 1 | 0 | 1 | 0 | 0 | 1 | 0 | 3 | 0 |
| 1 | 0 | 1 | 0 | X | X | 1 | 0 | 3 | 3 | 2 | 3 | 1 | 4 | 7 |
| 1 | 0 | 1 | 1 | X | X | 1 | 0 | 2 | 2 | 0 | 1 | 1 | 0 | 3 |
| 1 | 0 | 0 | 0 | X | X | 0 | 1 | 5 | 1 | 2 | 3 | 0 | 7 | 4 |
| 1 | 0 | 0 | 1 | X | X | 0 | 1 | 5 | 0 | 0 | 1 | 0 | 3 | 0 |
| 1 | 0 | 1 | 0 | X | X | 0 | 1 | 5 | 3 | 2 | 3 | 1 | 4 | 7 |
| 1 | 0 | 1 | 1 | X | X | 0 | 1 | 5 | 2 | 0 | 1 | 1 | 0 | 3 |

TABLE 9-continued (32 bit load)

| | | | | | | | | Multiplexer Select Signals | | | | | | |
|---|---|---|---|---|---|---|---|---|---|---|---|---|---|---|
| B[7] | B[6] | B[5] | B[4] | B[3] | B[2] | B[1] | B[0] | M1 | M2 | M3 | M4 | M5 | M6 | M7 |
| 1 | 0 | 0 | 0 | X | X | 1 | 1 | 0 | 1 | 2 | 3 | 0 | 7 | 4 |
| 1 | 0 | 0 | 1 | X | X | 1 | 1 | 1 | 0 | 0 | 1 | 0 | 3 | 0 |
| 1 | 0 | 1 | 0 | X | X | 1 | 1 | 3 | 3 | 2 | 3 | 1 | 4 | 7 |
| 1 | 0 | 1 | 1 | X | X | 1 | 1 | 2 | 2 | 0 | 1 | 1 | 0 | 3 |

TABLE 10

(64 bit load)

| | | | | | | | | Multiplexer Select Signals | | | | | | |
|---|---|---|---|---|---|---|---|---|---|---|---|---|---|---|
| B[7] | B[6] | B[5] | B[4] | B[3] | B[2] | B[1] | B[0] | M1 | M2 | M3 | M4 | M5 | M6 | M7 |
| 1 | 1 | 0 | X | X | X | X | X | 1 | 1 | 0 | 3 | 0 | 7 | x |
| 1 | 1 | 1 | X | X | X | X | X | 3 | 2 | 0 | 3 | 1 | 0 | x |

Figure 8:
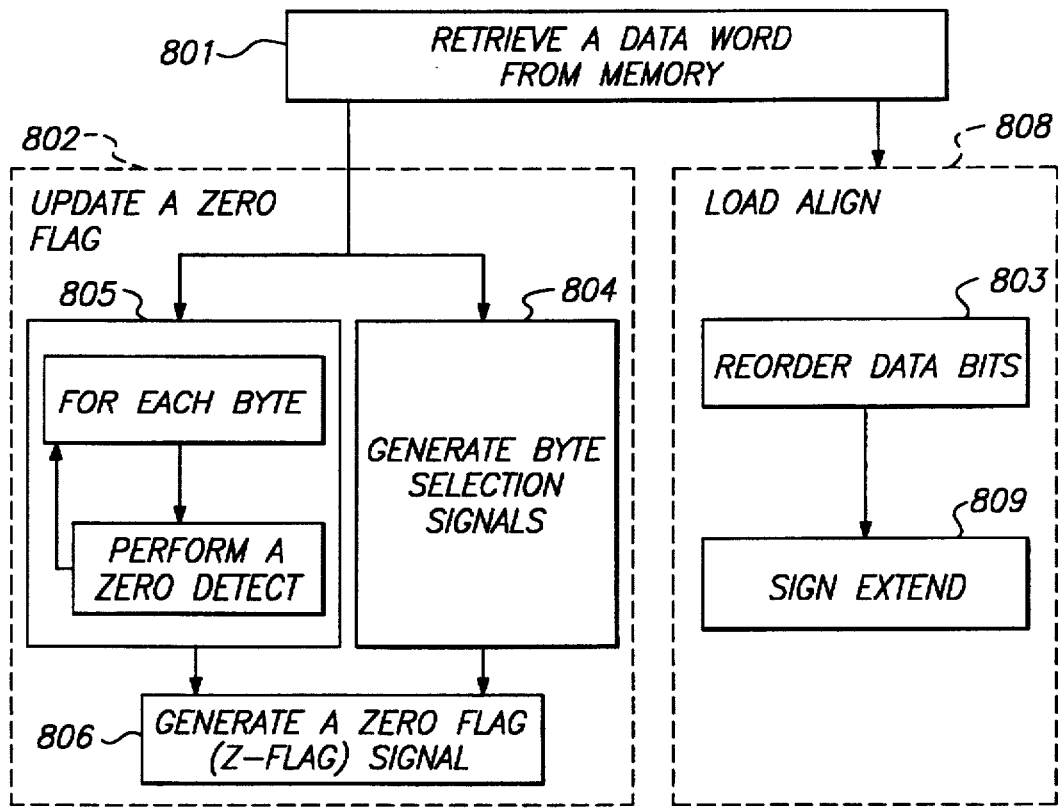
FIG. 8 is a flow chart of a method of generating a z-flag in accordance with the present invention.

FIG. 8 is a flow diagram of a method in accordance with the present invention. A data word containing a plurality of bits grouped into bytes is retrieved 801 from memory 101. In the illustrated embodiment, each retrieved words is eight bytes. Next, a zero flag signal is updated 802 and the retrieved data word is load aligned 808. Because the step of updating 802 the zero flag signal uses data that has not been load aligned 808, such step is performed simultaneous to load alignment 808.

As discussed above, depending on the particular format of the stored data, some of the retrieved bytes may not contain valid data and thus the eight byte word must be load aligned 808 to form an eight byte word wherein each of the eight bytes is valid. Load alignment 808 includes the steps of first reordering 803 the bits and then sign extending 809 the most significant bit to form a word. Bit reordering 803 is performed, for example, by multiplexing the retrieved bytes or by shifting the bits to either the left or the right by a specified number of bit positions or in any other way which changes the relative positions of the bits within the data word. Sign extension 809 duplicates the state, for example, "0" or "1" of the most significant bit of the valid data such that each bit in a higher bit position than the most significant bit of the valid data has the same state as such bit. Bit reordering 803 and sign extension 809 conforms the format of the retrieved data word with a desired data format.

In accordance with the present invention, the zero flag is updated 802 simultaneous to load alignment 808. Updating 802 the zero flag includes the steps of performing a zero-detect 805 on each byte of retrieved data to form a zero-detect signal and generating 804 a set of byte select signals responsive to the format of the retrieved data word. Such steps are followed by the step of generating 806 the zero flag. The zero flag is generated 806 for example, by selecting zero-detect signals responsive to the byte select signals and by then decoding the selected zero-detect signals. Zero-detect 808 generates a set of zero-detect signals each having a first state if any one of the bits of a received byte is not zero and having a second state if all of the bits of the byte are zero. Byte select signals are generated 804 responsive to a data format code indicating the format of the retrieved data.

In the illustrated embodiment, zero-detect 80S is performed simultaneous to the generation 804 of byte select signals. Thus, by updating 802 the zero flag simultaneous to aligning 808 the data, a faster memory access time is obtained.

What is claimed is:

1. An apparatus for generating a zero flag associated with a data word stored in a memory, the data word being stored in one of a plurality of data formats and comprising a plurality of bit groups comprising a plurality of bits, each bit having a first state and a second state, the apparatus comprising:

a first plurality of inputs coupled to the memory for receiving the data word from the memory;

a plurality of zero detect circuits each having a plurality of inputs coupled to a plurality of the first plurality of apparatus inputs for receiving a bit group and having an output having a first state responsive to each bit in the bit group being in the first state and having a second state responsive to at least one bit in the bit group not being in the first state;

data format code indicating the data format of the received data word;

a second plurality of inputs for receiving a plurality of bit group selection signals determined responsive to the data format code, the plurality of bit group selection signals having a plurality of selection states, each state corresponding to at least one of the zero detect circuit outputs;

a decoding circuit including:

a first plurality of inputs coupled to a plurality of the zero detect circuit outputs, second plurality of inputs coupled to a plurality of the second plurality of apparatus inputs for receiving the bit group selection signals, and an output having a first state responsive to all of the zero detect circuit outputs corresponding to the selection state of the bit selection signals being in the first state and having a second state responsive to at least one zero detect circuit output corresponding to the selection state of the bit selection signals not being in the first state; and a load aligner having a first plurality of inputs coupled to the memory for receiving the data word from the memory, a second plurality of inputs for receiving the data format code, and a plurality of outputs selectively coupled to the plurality of load aligner inputs responsive to the data format code.

2. An apparatus for generating a zero flag associated With a data word comprising a plurality of bit groups comprising a plurality of bits, each bit having a first state and a second state, the apparatus comprising:

first plurality of inputs for receiving the data word;

a plurality of zero detect circuits each having a plurality of inputs coupled to a plurality of the first plurality of apparatus inputs for receiving a bit group and having an output having a first state responsive to each bit in the bit group being in the first state and having a second state responsive to at least one bit in the bit group not being in the first state;

a second plurality of inputs for receiving a plurality of bit group selection signals, the plurality of bit group selection signals having a plurality of selection states, each state corresponding to at least one of the zero detect circuit outputs; and decoding circuit including:
first plurality of inputs coupled to a plurality of the zero detect circuit outputs,
a second plurality of inputs coupled to a plurality of the second plurality of apparatus inputs for receiving the bit group selection signals,
an output having a first state responsive to all of the zero detect circuit outputs corresponding to the selection state of the bit selection signals being in the first state and having a second state responsive to at least one zero detect circuit output corresponding to the selection state of the bit selection signals not being in the first state, a bit group selector for generating the bit group selection signals from a data format code having a plurality of bits and having a plurality of data format code states, the bit group selector comprising:
plurality of inputs for receiving the data format code; and
a plurality of outputs, the plurality having a plurality of states corresponding to a plurality of the data format code states, the plurality of outputs coupled a plurality Of the second plurality of apparatus inputs; and load aligner having a first plurality of inputs coupled to a plurality of the first apparatus inputs for receiving the data word, a second plurality of inputs for receiving the data format code, a plurality of outputs selectively coupled to the plurality of load aligner inputs responsive to the data format code.

3. In a system having memory and an arithmetic logic unit adapted to operate on data having a first data format, a method of operating on a data word having one of a plurality of data formats, the data word comprising a plurality of bit groups comprising a plurality of bits, each bit having a first state and a second state, the method comprising:

retrieving a data word from memory;

determining the data format associated with the data word;

generating a zero flag from the data word responsive to the determined data format; and in parallel with generating the zero flag, reformatting the data word to the first data format responsive to the determined data format and coupling the reformatted data to the arithmetic logic unit.

4. The method of claim 3 wherein generating a zero flag from the data word responsive to the determined data format comprises:

selecting a plurality of bit groups responsive to the determined data format;

determining whether any bit of the selected bit groups is in a first state;

responsive to each bit of the selected bit groups being in the first state, setting a zero flag to a first state; and responsive to any bit of the selected bit groups not being in the first state, setting a zero flag to a second state.

5. An apparatus for processing data comprising:

an arithmetic logic unit having an associated status register with a zero flag bit and adapted to operate on data having a first data format;

a memory for storing data in one of a plurality of data formats;

a data reformatter coupling the memory and the arithmetic logic unit for reformatting data retrieved from memory into the first data format;

a data format register coupled to the data reformatter for storing the data format associated with the stored data; and a zero flag generation circuit coupling the memory to the status register and coupled to the data format register, for generating a zero flag from data retrieved from memory responsive to the data format indicated by the data format register.

6. The apparatus of claim 5 wherein the data word comprises a plurality of bit groups comprising a plurality of bits, each bit having a first state and a second state and wherein the zero flag generation circuit comprises:

a plurality of zero detect circuits each for receiving a bit group and having an output having a first state responsive to each bit in the bit group being in the first state and having a second state responsive to at least one bit in the bit group not being in the first state;

a bit group selector for selecting a plurality of bit groups responsive to the data format code; and a decoding circuit including:
a first plurality of inputs coupled to a plurality of the zero detect circuit outputs,
a second plurality of inputs coupled to the bit group selection signals, and
an output having a first state responsive to all of the zero detect circuit outputs corresponding to the selected bit groups being in the first state and having a second state responsive to at least one zero detect circuit output corresponding to the selected bit group not being in the first state.

* * * * *

UNITED STATES PATENT AND TRADEMARK OFFICE
CERTIFICATE OF CORRECTION

PATENT NO. : 5,638,312
DATED : June 10, 1997
INVENTOR(S) : Michael A. Simone

It is certified that error appears in the above-indentified patent and that said Letters Patent is hereby corrected as shown below:

Column 12, line 47, insert the word --a-- before the first appearance of the word "data"

Column 12, line 58, insert the word --a-- before the word "second".

Column 13, line 7, delete the word "With" and insert in place thereof --with--.

Column 13, line 11, insert the word --a-- before the word "first".

Column 13, line 25, insert the word --a-- before the word "decoding".

Column 13, line 26, insert the word --a-- before the word "first".

Column 13, line 42, insert the word --a-- before the word "plurality".

Column 13, line 47, delete the word "Of" and insert in place thereof --of--.

Column 13, line 48, insert the word --a-- before the word "load".

Signed and Sealed this

Fifth Day of August, 1997

*Attest:*

BRUCE LEHMAN

*Attesting Officer*    *Commissioner of Patents and Trademarks*